United States Patent [19]

Kinkade et al.

[11] Patent Number: 5,009,295
[45] Date of Patent: Apr. 23, 1991

[54] TRANSMISSION SHIFTER TO OPERATOR CONTROLLED MECHANISM INTERLOCK

[75] Inventors: Charles E. Kinkade, Dryden; Harold L. Sharp, Union Lake; Robert F. Vrbensky, Utica, all of Mich.

[73] Assignee: General Motors Corporation, Detroit, Mich.

[21] Appl. No.: 447,778

[22] Filed: Dec. 8, 1989

[51] Int. Cl.⁵ .............................................. B60K 41/26
[52] U.S. Cl. ..................................... 192/4 A; 74/878; 180/271
[58] Field of Search ..................... 192/4 R, 4 A, 4 C; 180/271; 74/878

[56] References Cited

U.S. PATENT DOCUMENTS

| | | | |
|---|---|---|---|
| 3,930,555 | 1/1976 | Iijima | 180/82 A |
| 3,939,939 | 2/1976 | Okazaki | 180/82 C |
| 3,939,940 | 2/1976 | Sasabe et al. | 180/82 C |
| 3,942,614 | 3/1976 | Thompson | 192/4 A |
| 3,948,339 | 4/1976 | Iwanaga | 180/82 C |
| 3,958,658 | 5/1976 | Miyauchi et al. | 180/82 C |
| 4,187,935 | 2/1980 | O'Hern | 192/4 A |
| 4,880,092 | 11/1989 | Kito et al. | 192/4 A |
| 4,884,668 | 12/1989 | Kobayashi et al. | 192/4 A |
| 4,887,702 | 12/1989 | Ratke et al. | 192/4 A |
| 4,905,802 | 3/1990 | Gotoh | 192/4 A |

FOREIGN PATENT DOCUMENTS 0315173  5/1989  European Pat. Off. ............ 192/4 R Primary Examiner—Rodney H. Bonck
Attorney, Agent, or Firm—Donald F. Scherer

[57] ABSTRACT

The transmission shift range selector is held in a Park position by a solenoid attached on one end to a Park-/Lock mechanism and to a housing on the other end, until an operator controlled mechanism has been manipulated prior to attempting to shift the range selector.

1 Claim, 4 Drawing Sheets

TRANSMISSION SHIFTER TO OPERATOR CONTROLLED MECHANISM INTERLOCK

TECHNICAL FIELD

This invention relates to control devices for controlling the shifting of automatic vehicle drive transmissions from one shift range to another. The exemplary embodiment described in this disclosure establishes a mechanism which blocks an attempt to shift from a Park range to a non-Park range prior to manipulation of an operator controlled mechanism. The specific manipulation required for the exemplary embodiment is the depressing of the service brake pedal.

BACKGROUND OF THE INVENTION

In many vehicles currently equipped with automatic transmissions, the decision of when to shift from a non-drive range to a drive range is made entirely by the operator of the vehicle. Vehicles equipped with a Park/Lock mechanism, block shifting from the Park range until the ignition switch is in the run position. There are no further constraints on shifting of these vehicles based on either the position of the accelerator pedal or the position of the brake pedal.

Prior art devices have been proposed to prevent shifting of a transmission until after the manipulation of an operator controlled mechanism. Two commonly suggested manipulations are the fastening of seat belts and the depressing of the service brake pedal. Prior art devices have also employed solenoids in preventing shifting.

Solenoids have been used to prevent shifting by moving restricting plates, linking and unlinking the shift lever from the rest of the shifter, blocking the motion of the shift linkage by inserting a pin in the linkage path, and engaging a pawl with a rack.

SUMMARY OF THE INVENTION

This invention requires a vehicle operator to manipulate an operator controlled mechanism, such as the depressing of a brake pedal, to make it possible to shift from a Park range.

The device disclosed here is unique in that a solenoid is attached to a Park/Lock mechanism in parallel with or in place of a Park/Lock mechanism actuating cable. The solenoid can provide a travel limit for the Park/Lock. An advantage of this device over the prior art is that there is a minimum of additional mechanical componentry needed to effect the desired locking of the shifter. Another advantage of this system is that it is quiet. It does not generate the clicking or other objectionable noises of prior art solenoid systems, because the solenoid does not produce any motion when being either energized or deenergized. The solenoid holds the Park/Lock mechanism in the lock position when energized, with the magnetic force generated between the solenoid armature and the solenoid pole piece preventing the shifter from being moved out of the Park range.

It is an object of this invention to provide an improved shift control for an automatic transmission which requires at least one operator controlled mechanism to be manipulated prior to allowing the transmission to be shifted from a Park range, wherein the control employs a Park/Lock mechanism and an electromagnetic solenoid co-acting, in combination, as a lock which stops the position selector from being moved out of the Park range.

It is another object of this invention to provide an improved shift control for an automatic transmission which requires at least one operator controlled mechanism to be manipulated prior to allowing the transmission to be shifted from a Park range, wherein the control employs a Park/Lock mechanism and an electromagnetic solenoid co-acting, in combination, as a lock which stops the position selector from being moved out of the Park range, and further wherein a circuit is used to energize the solenoid in response to inputs from switches indicating the shift range position of the gear range selector, and whether the operator controlled mechanism has been manipulated.

It is still another object of this invention to provide an improved shift control for an automatic transmission including at least one operator controlled mechanism which must be manipulated prior to allowing the transmission to be shifted from a Park range, wherein the control employs a Park/Lock mechanism and an electromagnetic solenoid as a lock which stops the position selector from being moved out of the Park range and further includes a switch which is closed when the operator controlled mechanism is not being manipulated, thereby completing a circuit to the solenoid.

It is yet another object of this invention to provide an improved shift control for an automatic transmission which requires at least one operator controlled mechanism to be manipulated prior to allowing the transmission to be shifted from a Park range, wherein the control employs a Park/Lock mechanism and an electromagnetic solenoid co-acting, in combination, as a lock which stops the position selector from being moved out of the Park range, with the solenoid also serving as a travel limit for the Park/Lock mechanism.

It is a further object of this invention to provide an improved shift control for an automatic transmission which requires at least one operator controlled mechanism to be manipulated prior to allowing the transmission to be shifted from a Park range employing a Park/Lock mechanism and an electromagnetic solenoid, in combination, for stopping the position selector from being moved out of the Park range, and wherein the solenoid also serves as a travel limit for the Park/Lock mechanism in response to a circuit which energizes the solenoid by way of inputs from a switch responsive to the operator controlled mechanism.

It is still a further object of this invention to provide an improved shift control for an automatic transmission which requires at least one operator controlled mechanism to be manipulated prior to allowing the transmission to be shifted from a Park range employing a Park/Lock mechanism and an electromagnetic solenoid co-acting, in combination, as a lock which stops the position selector from being moved out of the Park range, with the solenoid also serving as a travel limit for the Park/Lock mechanism, using switches, which are closed when the gear range selector is in the Park range and the operator controlled mechanism is not being manipulated, for completing a circuit to the solenoid.

It is still an even further object of this invention to provide an improved shift control for an automatic transmission which requires the depression of the service brake pedal before the transmission can be shifted from a Park range employing a Park/Lock mechanism and an electromagnetic solenoid co-acting, in combination, as a lock which stops the position selector from being moved out of the Park range, with the solenoid also serving as a travel limit for the Park/Lock mechanism.

It is yet a further object of this invention to provide an improved shift control for an automatic transmission which requires the depression of the service brake pedal before the transmission can be shifted from a Park range employing a Park/Lock mechanism and an electromagnetic solenoid co-acting, in combination, which stops the position selector from being moved out of the Park range, with the solenoid also serving as a travel limit for the Park/Lock mechanism, and also wherein a circuit is provided to energize the solenoid via input to the circuit from at least one switch which is responsive to manipulation of the operator controlled mechanism.

It is yet another object of this invention to provide an improved shift control for an automatic transmission which requires the depression of the service brake pedal before the transmission can be shifted from a Park range employing a Park/Lock mechanism and an electromagnetic solenoid co-acting, in combination, as a lock which stops the position selector from being moved out of the Park range, with the solenoid also serving as a travel limit for the Park/Lock mechanism, and wherein switches are provided and are closed when the gear range selector is in the Park range and the operator controlled mechanism has not been manipulated from Park.

These and other objects and advantages will be more apparent from the following description and drawings.

DESCRIPTION OF THE PREFERRED EMBODIMENT

The accompanying drawings illustrate one representative form of an operator controlled transmission shift range position selector mechanism capable of preventing the transmission from being shifted from the Park range prior to depression of the service brake pedal.

Figure 1:
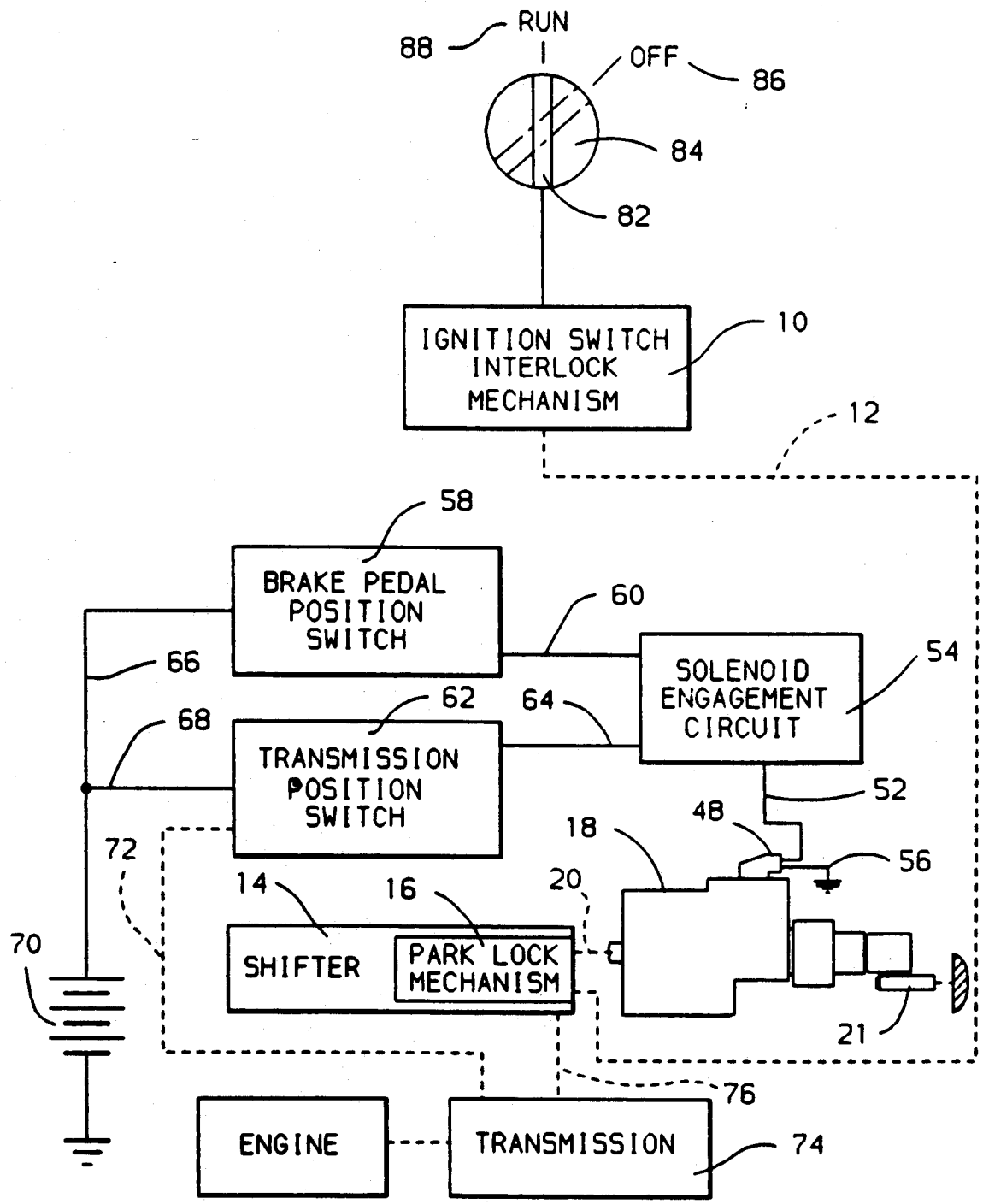
FIG. 1 is a schematic representation of the exemplary embodiment the invention with one control configuration.
Figure 2:
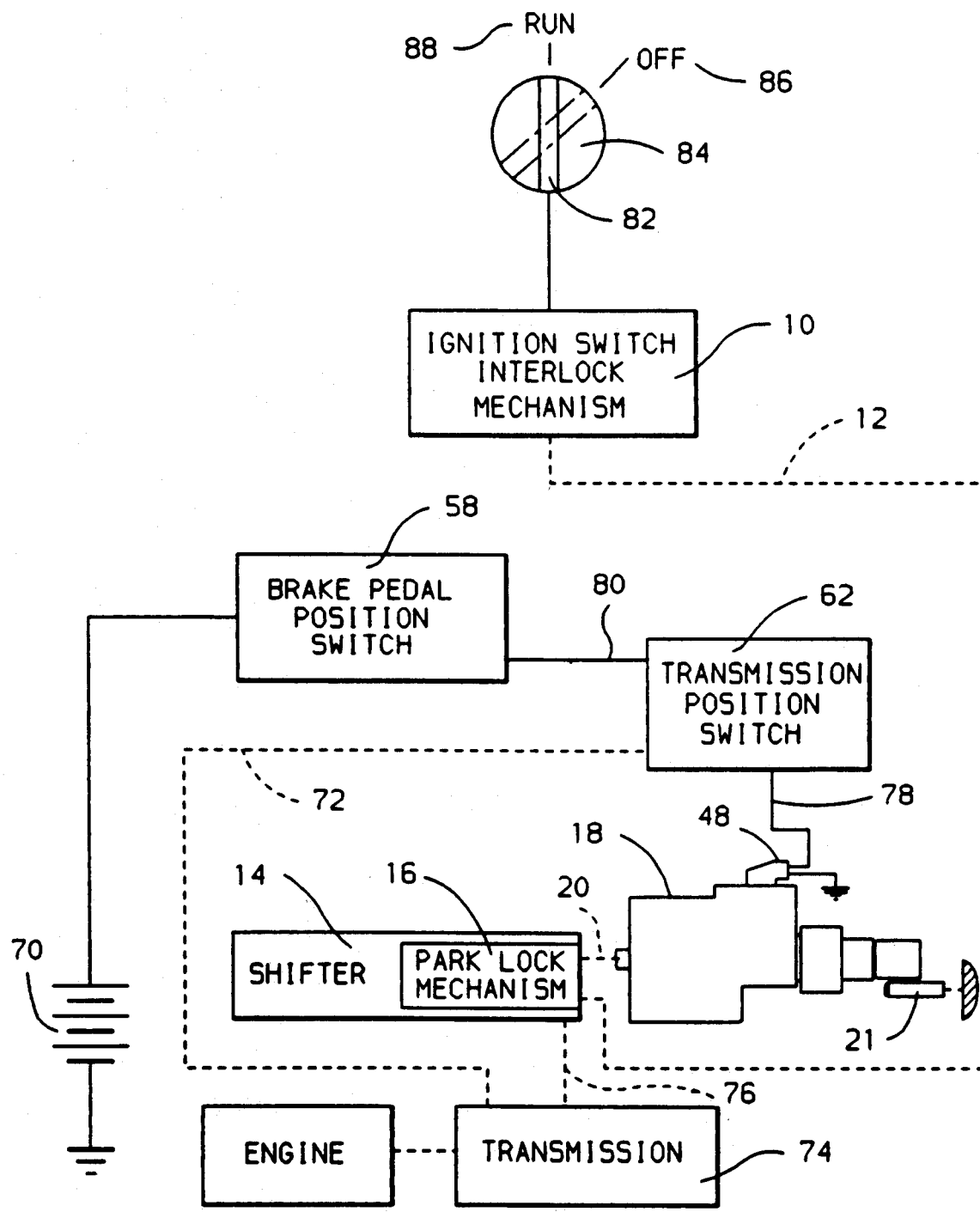
FIG. 2 is a schematic representation of the exemplary embodiment of the present invention with an alternative control configuration.

The schematic representations in FIG. 1 and FIG. 2 both show an ignition switch interlock mechanism 10 similar to that disclosed in U.S. Pat. No. 4,270,624 issued June 2, 1981, to Jessop, or U.S. Pat. No. 4,296,847 issued Oct. 27, 1981, to Arndt, both assigned to the assignee of this disclosure, with a cable 12 which links the interlock to a transmission shifter 14. The shifter 14 is capable of placing the transmission into the following ranges: P (park); R (reverse gear); N (neutral); OD (overdrive - low gear to overdrive gear); D (drive - low gear to direct gear); 2 (low gear to second gear); and L (low gear). The specific part of the shifter 14 to which the cable 12 is attached is a Park/Lock mechanism 16 like that disclosed in U.S. Pat. No. 4,474,085, issued Oct. 2, 1984, to DeVogelaere et al. and assigned to the assignee of this disclosure. A solenoid 18 is linked in parallel with the cable 12 to the same part of the Park/Lock mechanism 16 as is the cable on the first end 28 of the solenoid 18 and to ground on the second end 36.

Figure 3:
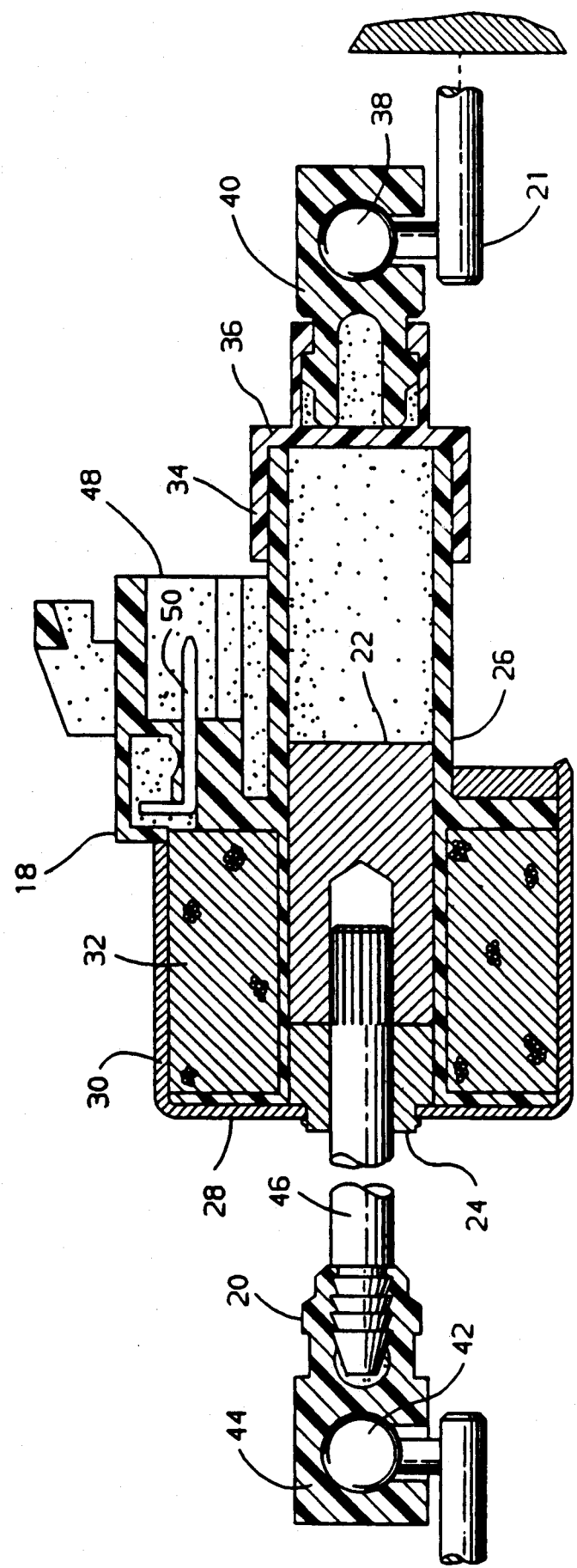
FIG. 3 is a sectional view of a locking solenoid element of the present invention.

The solenoid 18 and its end linkages 20 and 21 comprise several elements which are shown in FIG. 3. Primary among the solenoid elements are an armature 22 and a pole piece 24 of the solenoid 18. The armature 22 translates axially within a bobbin 26. The bobbin 26 is made of nonmagnetic material and, is surrounded on the first end 28 by a solenoid coil 32. A can 30, capable of transmitting a magnetic field, surrounds the outside of the solenoid coil 32. An end piece 34 fixed to the second end 36 of the solenoid 18 accommodates the second end linkage 21. The second end linkage 21, connected with a stationary housing portion, comprises a ball 38 and socket 40. The ball 38 is connected to ground. The socket 40 is connected to the end piece 34. The first end linkage 20 comprises a ball 42 and a socket 44. The first end ball 42 is connected to the Park/Lock mechanism 16. The first end socket 44 is connected to a rod 46 that engages the armature 22.

An electrical connector 48 is formed integral with the bobbin 26. An electrical connector stake 50 is molded into the connector 48 and is electrically connected to the coil 32.

As shown in FIG. 1, the solenoid 18 is electrically connected through its electrical connector 48 and by a wire 52 to a conventional solenoid engagement circuit 54 and by a second wire 56 to ground. The solenoid engagement circuit 54 is electrically connected to both a brake position switch 58 by a wire 60, and to a transmission position switch 62 by a wire 64. The transmission position switch 62 and the brake pedal position switch 58 are electrically connected by wires 66 and 68 to a voltage source 70.

Alternatively, as shown in FIG. 2, the solenoid 18 is electrically connected through its electrical connector 48 by a wire 78 to a transmission position switch 62, which is electrically connected by a wire 80 to a brake pedal position switch 58. The brake pedal position switch 58 is electrically connected to a voltage source 70 by a wire 80.

The brake pedal position switch 58 employed may be the same as the one disclosed in U.S. Pat. No. 4,257,503 issued Mar. 24, 1981, to Lutnick, and assigned to the assignee of this disclosure. A neutral start switch can be used as the transmission position switch 62. Neutral start switches are well known and widely used with automatic transmissions. The transmission position switch 62 has a link 72 to the transmission 74. The shifter 14 has a link 76 connecting it to the transmission 74.

When the operator (not shown) of the vehicle (not shown) attempts to move the shifter 14 out of the Park range into a drive range, he will not be able to do so unless a key 82 in an ignition switch 84 has been turned from an off position 86 to a run position 88. This blocking of the shifting will be effected by the Park/Lock mechanism 16 in the shifter 14 interacting with the ignition switch interlock mechanism 10 through the connecting cable 12 in a well known manner.

The Park/Lock mechanism 16 prevents shifting out of the Park range when the cable 12 is restrained from moving out of the lock position by the ignition switch interlock 10 when the key 82 is in the off position 86. Turning the key 82 in the ignition switch 84 to the run position 88 places the ignition switch interlock mechanism 10 in the released position, freeing the cable 12 to move. Were the Park/Lock cable 12 the only potential restraint on the Park/Lock mechanism 16, the Park/Lock mechanism 16 could then be overcome, allowing the shifter 14 to be moved out of the Park range. The solenoid 18, however, is also attached to the Park/Lock mechanism 16. When the solenoid 18 is energized, and its armature and pole piece are in contact, it serves the same function as the cable 12 and ignition switch interlock mechanism 10 in that it prevents shifting out of Park.

The contact between the solenoid armature 22 and the pole piece 24 is ensured by having the solenoid 18 serve as a travel limit for the Park/Lock mechanism 16. A force, used by the Park/Lock mechanism 16 to return the cable 12 to the lock position when the shifter is in the Park range, simultaneously pushes the armature 22 into contact with the pole piece 24.

The solenoid 18 holds the Park/Lock mechanism 16 at the shifter 14 in the lock position independent of any travel restriction on the cable 12 preventing the shifter 14 from being moved from the Park range unless the brake pedal is depressed. The solenoid 18 is energized when the brake pedal is not depressed, developing a force between pole piece 24 and the armature 22. This force prevents the Park/Lock mechanism 16 from being moved out of the lock position, thereby preventing the shifter 14 from being moved out of the Park range.

In the arrangement shown in FIG. 1, the solenoid 18 remains energized while the shifter 14 is in the Park range, blocking the shifter 14 from being moved until the brake pedal is depressed. The solenoid engagement circuit 54 provides the energizing voltage to the solenoid 18 when the signal from the brake pedal switch 58 indicates that the brake pedal is not depressed, and the signal from the transmission position switch 62 indicates that the transmission 74 is in a nondrive range.

In the alternative arrangement, shown in FIG. 2, the solenoid 18 also remains energized while the shifter 14 is in the Park range, blocking the shifter 14 from being moved until the brake pedal is depressed. The transmission position switch 62 is closed in the Park range and open in all other ranges. The solenoid will only be energized when the shifter is in the Park range. The brake pedal position switch 58 remains closed until the brake pedal is depressed. When the brake pedal is depressed and the position switch 58 opens, the flow of electrical current to the solenoid 18 is interrupted, allowing the shifter 14 to be moved into the drive range.

A third alternative to the electrical circuits, not shown, is to eliminate the transmission position switch 62. In this embodiment, the solenoid is energized whenever the service brake is not actuated and the switch 58 is closed. With this arrangement, the brake switch 58 is opened when shifting from park is desired, thereby deenergizing the solenoid 18 such that the shifter 14 can be moved from Park. When the shifter 14 is not in the Park position, the distance between armature 22 and pole piece 24 will be sufficient to reduce the magnetic attraction therebetween, to prevent the armature 22 from being drawn to the pole piece 24. However, with this alternative, a continuous current flow will be present through the solenoid whenever the ignition switch 84 is not in Lock and the brakes are not engaged. This current flow is small compared to the total vehicle system current flow and therefore will not interfere with the electrical operation of the vehicle.

Figure 4:
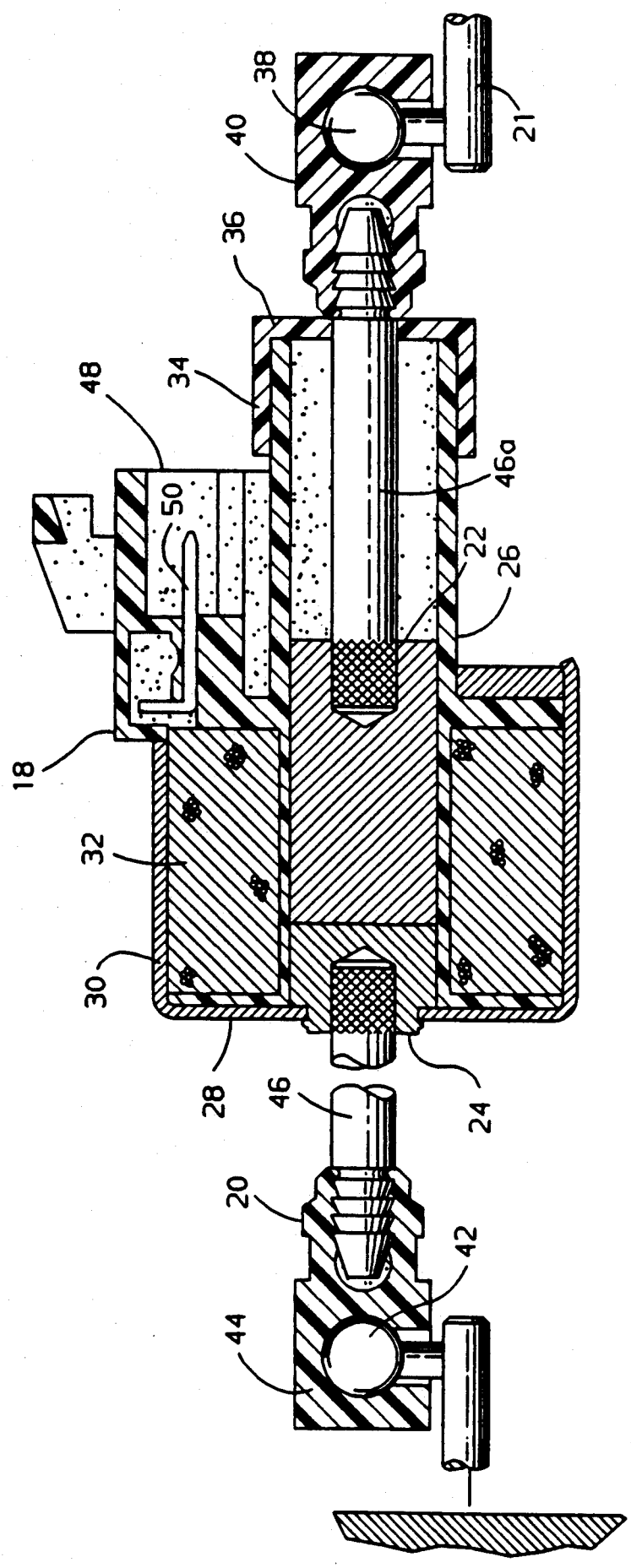
FIG. 4 is a sectional view of another embodiment of a locking solenoid element of the present invention.

The alternative solenoid construction for the solenoid 18, shown in FIG. 4, has the pole piece 24 connected to the rod 46 and the armature 22 connected to the linkage 21 by a rod 46a. The linkage 21 is preferably connected to the Park Lock mechanism 16 and the linkage 20 is grounded in this alternative. With this embodiment, the armature is pulled by the linkage 21 from contact with the pole piece 24 and the stop position shown, when the transmission is shifted from Park and the service brake is depressed. This significantly reduces the magnetic attraction between the pole piece 24 and the armature 22, when the service brake is released and the solenoid is energized, thus rendering the solenoid ineffective until the transmission shifter is returned to the Park position.

Also, with this invention, the magnetic attraction force between the pole piece 24 and the armature 22 can be established at a level that will permit the operator to overcome the lock arrangement if sufficient force is applied to the Park Lock mechanism and the ignition switch is not in the lock position. The level of the required force is to be sufficiently high, for example fifty (50) pounds, to indicate to the driver that the brake has not been depressed.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A shift control in an automatic transmission on a vehicle having at least one operator controlled mechanism to be manipulated prior to the transmission being shifted from a Park range comprising:
   position selector means movable to control setting of said transmission and having Park/Lock means for mechanically blocking the movement of said position selector means from said Park range until said Park/Lock means is released including
   selectively energizable electromagnetic solenoid means for holding stationary said Park/Lock means and said position selector means when said transmission is in said Park range prior to manipulation of said operator controlled mechanism; and
   said solenoid means providing travel stop means for said Park/Lock means when said position selector means is placed in said Park range and having an armature and a pole piece which are separated sufficiently to reduce the magnetic attraction therebetween to an ineffective level when the position selector means is moved from the Park range and the operator controlled mechanism is in the unmanipulated condition.

* * * * *